(12) United States Patent
Buch et al.

(10) Patent No.: US 8,369,115 B2
(45) Date of Patent: Feb. 5, 2013

(54) TIME DOMAIN VOLTAGE STEP DOWN CAPACITOR BASED CIRCUIT

(75) Inventors: Fredrik Buch, Santa Clara, CA (US); Michael S. Briner, San Jose, CA (US)

(73) Assignee: Greenliant LLC, Santa Clara, CA (US)

( * ) Notice: Subject to any disclaimer, the term of this patent is extended or adjusted under 35 U.S.C. 154(b) by 737 days.

(21) Appl. No.: 12/485,735

(22) Filed: Jun. 16, 2009

(65) Prior Publication Data
US 2010/0315848 A1 Dec. 16, 2010

(51) Int. Cl.
*H02M 3/18* (2006.01)
(52) U.S. Cl. .......................................... 363/60
(58) Field of Classification Search .................... 363/59, 363/60; 327/535, 536
See application file for complete search history.

(56) References Cited

U.S. PATENT DOCUMENTS

| 4,451,743 | A | 5/1984 | Suzuki et al. |
| 6,438,005 | B1 | 8/2002 | Walter |
| 6,518,830 | B2* | 2/2003 | Gariboldi et al. ............. 327/536 |
| 7,505,290 | B2* | 3/2009 | Fujiwara .......................... 363/60 |
| 7,928,806 | B2* | 4/2011 | Lee et al. ......................... 331/17 |

* cited by examiner

*Primary Examiner* — Matthew Nguyen
(74) *Attorney, Agent, or Firm* — DLA Piper LLP (US)

(57) ABSTRACT

A time domain voltage step down capacitor based circuit has an oscillating circuit for generating a clock signal. The circuit also has a capacitor based charge pump circuit for receiving the clock signal and an input voltage signal having an input current and generates an output voltage signal, less than the input voltage signal and an output current greater than the input current. The circuit further comprises a comparator circuit for receiving the output voltage signal, as a first input signal thereto, and a reference voltage signal as a second input signal thereto and compares the first input signal to the second input signal and generates a control signal in response thereto. Finally the control signal is supplied to the oscillating circuit to control the generating of the clock signal.

8 Claims, 5 Drawing Sheets

US 8,369,115 B2

TIME DOMAIN VOLTAGE STEP DOWN CAPACITOR BASED CIRCUIT

TECHNICAL FIELD

The present invention relates to a capacitor based voltage step down circuit with time domain feedback, and more particularly wherein the step down circuit decreases the voltage output but increases the current.

BACKGROUND OF THE INVENTION

Circuits to transform power from a first source to a second source are well known in the art. In an AC (alternating current/voltage) scheme, one technique is to use a transformer. Transformers may also be used to transform power from a DC (Direct Current) source. However, the DC source must be first converted to an AC (Alternating Current) power signal.

Circuits to convert DC power directly to another DC power are also well known in the art For example, a Buck converter is well known in the art. However, such converters have focused upon voltage conversion, such as voltage multiplication and not on current multiplication. See also U.S. Pat. Nos. 4,451,743 and 6,438,005.

For portable devices that operate on batteries, the battery life is extremely important. Thus, it is desired to use as efficiently as possible the current capability of the battery. Thus, there is a need for a circuit to convert DC directly to DC while maintaining efficiency.

SUMMARY OF THE INVENTION

In the present invention, a voltage conversion circuit comprises an oscillating circuit for generating a clock signal. The circuit also comprises a capacitor based charge pump circuit for receiving the clock signal and an input voltage signal having an input current and generates an output voltage signal, less than the input voltage signal and an output current greater than the input current. The conversion circuit further comprises a comparator circuit for receiving the output voltage signal, as a first input signal thereto, and a reference voltage signal as a second input signal thereto and compares the first input signal to the second input signal and for generates a control signal in response thereto. Finally the control signal is supplied to the oscillating circuit to control the generating of the clock signal.

DETAILED DESCRIPTION OF THE PREFERRED EMBODIMENT

Figure 1:
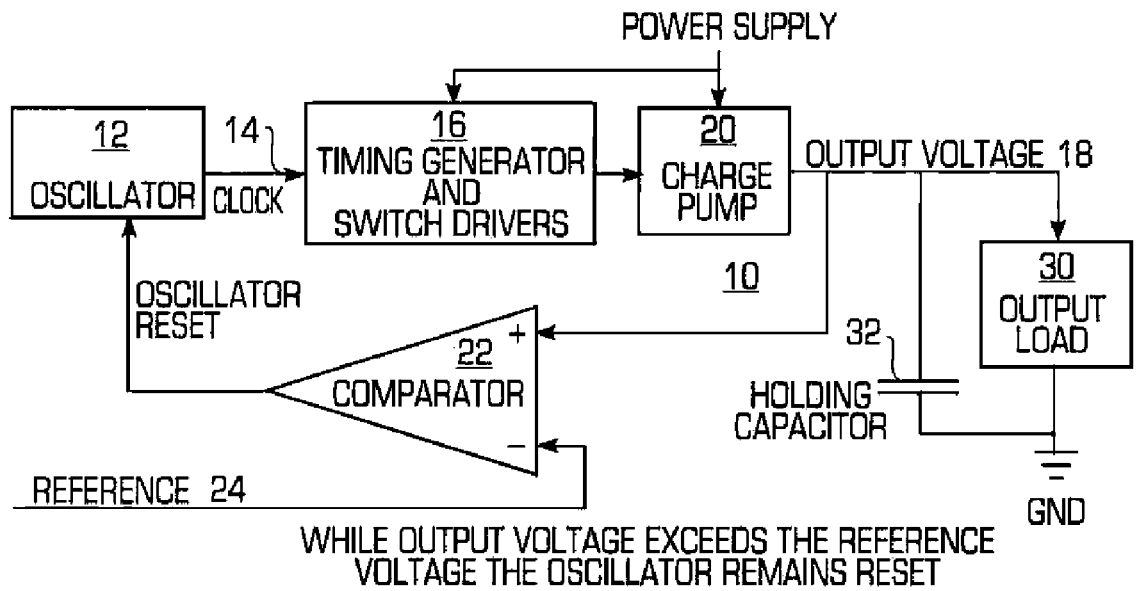
FIG. 1 is a block level diagram of a voltage conversion circuit for the present invention.

Referring to FIG. 1 there is shown a block level diagram of a voltage conversion circuit 10 of the present invention. The voltage conversion circuit 10 may be used to convert any DC source directly to another DC source. However, preferably, the circuit 10 is used in a portable electronics device to convert DC power from a battery having a first voltage, such as +3.0 volts, to a lower voltage but with a greater current, thereby preserving the battery life.

The circuit 10 comprises an oscillating circuit 12 that generates a series of clock signals 14. As will be seen hereinafter some of the clock signals 14 in some of the embodiments may be out of phase with respect to one another by about one hundred eighty degrees. In other embodiments, the clock signals may be out of phase by about 120 degrees and 240 degrees.

The clock signals 14 are supplied to a timing generator and switching driver circuit 16. Since the circuit 10 uses a charge pump 20 having a class of switched capacitor circuits, such that the switches are large n-CMOS and/or p-CMOS transistors, the switches impose two requirements. First, one set of the switches must generally be switched fully 'off' before another set of switches can be switched 'on', to prevent leakage or 'crowbar current'. This type of switching is often referred to as 'Break-before-Make' switching. The second requirement is that since the switches are large, the drivers for the switches must contain buffers. A buffer is a circuit that allows a control voltage to drive a large load, while maintaining fast output rise and fall times. Thus the timing generator and switching driver circuit 16 provides these controls.

From the timing generator and switching driver circuit 16, the clock signals 14 are supplied to a charge pump circuit 20, whose various embodiments will be discussed hereinafter. As will be seen, the purpose of the charge pump circuit 20 is to determine the amount of voltage step down (and conversely the degree of current multiplication) is to be accomplished by the circuit 10. The input voltage Vcc is supplied to the charge pump circuit 20 and to the timing generator and switch driver circuit 16.

The output of the charge pump circuit 20 is the output voltage signal 18. Typically, a holding output capacitor 32 having a capacitance of C, connects between the output voltage signal 18 and ground. In addition a load 30 also connects between the output voltage signal and ground.

The output voltage signal 18 (or a fraction of it, obtained by a resistor divider) is also supplied to a comparator circuit 22. The comparator circuit 22 also receives as another input thereto, a reference signal 24. Thus, the comparator circuit 22 compares the output voltage signal 18 with the reference voltage signal 24 and generates a signal which is used to reset the oscillator 12. In the event the comparison shows that the output voltage signal 18 is above the reference voltage signal 24, then the comparator circuit 22 would cause the oscillator 12 to be reset, thereby shutting it off. However, if the comparison shows that the output voltage signal 18 is below the reference voltage signal 24, then the comparator circuit 22 would allow the oscillator circuit 12 to continue to operate, which would generate the desired output voltage signal 18.

Figure 2:
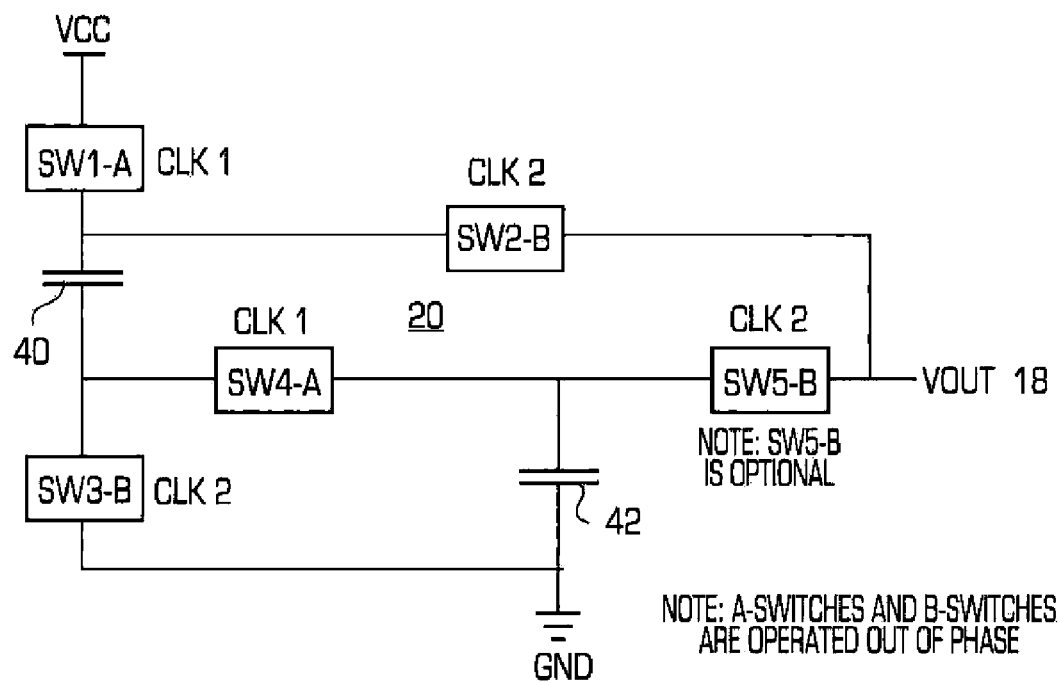
FIG. 2 is a circuit diagram of a first embodiment of the charge pump portion of the voltage conversion circuit shown in FIG. 1.

Referring to FIG. 2 there is shown a first embodiment of the charge pump circuit 20 of the present invention. In this embodiment 20, the charge pump 20 has two capacitors 40 and 42, each having the same capacitance. Each of the capacitors 40 and 42 has a first end and a second end. The second ends of the capacitors 40 and 42 are connected together through switch SW4-A and supplies the output voltage signal Vout 18 through an optional switch SW5-B. The first end of the capacitor 42 is connected to ground. The first end of the capacitor 40 is connected to the input voltage Vcc through a switch SW1-A. The first end of the capacitor 40 is also connected to the output voltage signal Vout 18 through a switch SW2-B. Finally, the second end of the capacitor 40 is also connected to ground through a switch SW3-B. The switches SW1-A and SW4-A are activated by a first clock signal. The switches SW2-B, SW3-B and SW5-B are activated by a second clock signal. The first and second clock signals are out of phase by about one hundred eighty degrees. Each of the switches SW1-A, SW4-A and SW2-B, SW3-B and SW5-B can be a transistor.

In the operation of the charge pump 20, in the event the first clock signal is active, then the switches SW1-A and SW4-A are on, connecting the input voltage Vcc to the first end of the capacitor 40, through the capacitor 42 to ground. During this phase, the input power supply Vcc supplies a voltage of Vcc across the two capacitors 40 and 42 which are connected in series, and supplies a current of I which is stored by each of the capacitors 40 and 42. Once the capacitors 40 and 42 have been so charged, the first clock signal is turned off. The second clock signal then turns on. In this phase, the second clock signal turns on the switches SW2-B, SW3-B, and SW5-B and connects Vout 18 to the first end of the capacitor 40, with switch SW3-B connecting the second end of the capacitor 40 to ground. At the same time, Vout 18 is also connected to the second end of the capacitor 42 through the switch SW5-B, with the first end of the capacitor 42 connected to ground. In this manner during this phase, capacitors 40 and 42 are connected in parallel. Further, since the capacitors 40 and 42 have the same (or similar) capacitance, the voltage stored at the output signal node would be Vcc/2. However, because the capacitors 40 and 42 are connected in parallel, the current that can be supplied at the output signal node is 2I. Thus, during the phase when the second clock signal is active, the output signal node can supply a voltage of Vcc/2 but with twice the current or 2I, as in the phase when the first clock signal is active.

Figure 3:
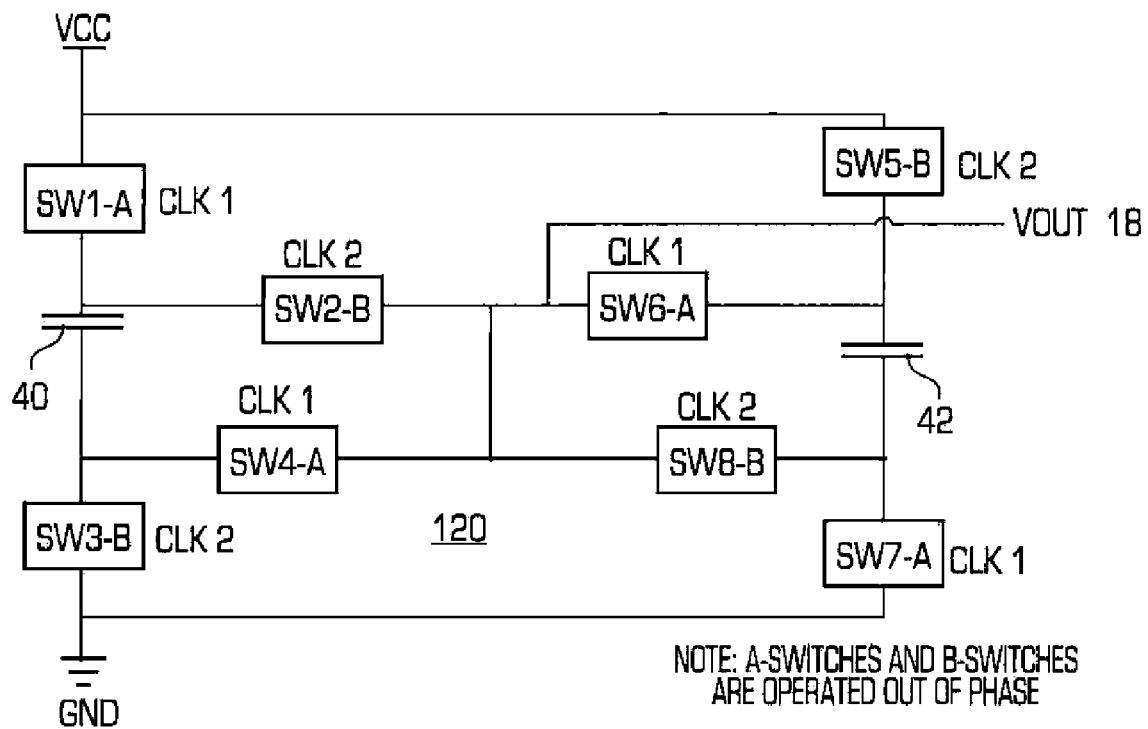
FIG. 3 is a circuit diagram of a second embodiment of the charge pump portion of the voltage conversion circuit shown in FIG. 1.

Referring to FIG. 3 there is shown a second embodiment 120 of the charge pump circuit portion of the conversion circuit 10 of the present invention. The charge pump circuit 120 is similar to the charge pump circuit 20 shown in FIG. 2, and comprises two capacitors 40 and 42, each having the same (or similar) capacitance. Each of the capacitors 40 and 42 has a first end and a second end. The second ends of the capacitors 40 and 42 are connected together through switches SW4-A and SW-8 B. At the junction of the connection of switch SW4-A and SW8-B is the output voltage signal Vout 18. The first end of the capacitor 40 is connected to the input voltage Vcc through a switch SW1-A. The first end of the capacitor 40 is also connected to the first end of the capacitor 42 through switches SW2-B and SW6-A. In addition, the junction of the connection of the switches SW2-B and SW6-A is also connected to the junction of the connection of SW4-A and SW8-B and is also connected to the output voltage signal Vout 18. The first end of the capacitor 42 is also connected to the input voltage Vcc through a switch SW5-B. The second end of the capacitor 40 is also connected to ground through switch SW3-B. Finally, the second end of the capacitor 42 is also connected to ground through switch SW7-A. Switches SW1-A, SW4-A, SW6-A and SW7-A are switched by a first clock signal CLK 1. The switches SW3-B, SW2-B, SW8-B and SW5-B are switched by a second clock signal CLK 2. The first and second clock signals are out of phase by about one hundred eighty degrees. Each of the switches SW1-A, SW2-B, SW3-B, SW4-A, SW5-B, SW6-A, SW7-A, and SW8-B can be a transistor In the operation of the charge pump 120, in the event the first clock signal CLK 1 is active, then the switches SW1-A, SW4-A, SW6-A, and SW7-A are on, connecting the input voltage Vcc to the first end of the capacitor 40 through the switch SW4-A, to the output voltage signal Vout 18, through the switch SW6-A, through the second capacitor 42 and to ground through the second end of the capacitor 42 through switch SW7-A. During this phase, the input power supply Vcc supplies a voltage of Vcc across the two capacitors 40 and 42 which are connected in series, and supplies a current of I which is stored by each of the capacitors 40 and 42. Thus, during this phase, the output voltage Vout 18 is Vcc/2. Once the capacitors 40 and 42 have been so charged, the first clock signal CLK 1 is turned off. The second clock signal CLK 2 then turns on. In this phase, the second clock signal CLK 2 connects the first end of the capacitor 42 to Vcc through the switch SW5-B, and connects the second end of the capacitor 42 to Vout 18, and to the first end of the capacitor 40 in series thereto, and connects the second end of the capacitor 40 to ground through the switch SW3-B. Again, since the capacitors 40 and 42 have the same capacitance, the voltage at the output signal node Vout 18 would be Vcc/2. However, because the capacitors 40 and 42 each has stored charges equal to the current I, the current that can be supplied at the output signal node Vout 18 is 2I, since the capacitor 40 and 42 have been charged from the previous clock cycle. Thus, during the phase when the second clock signal CLK 2 is active, the output signal node can supply a voltage of Vcc/2 but with twice the current or 2I as in the phase when the first clock signal CLK 1 is active.

Figure 4:
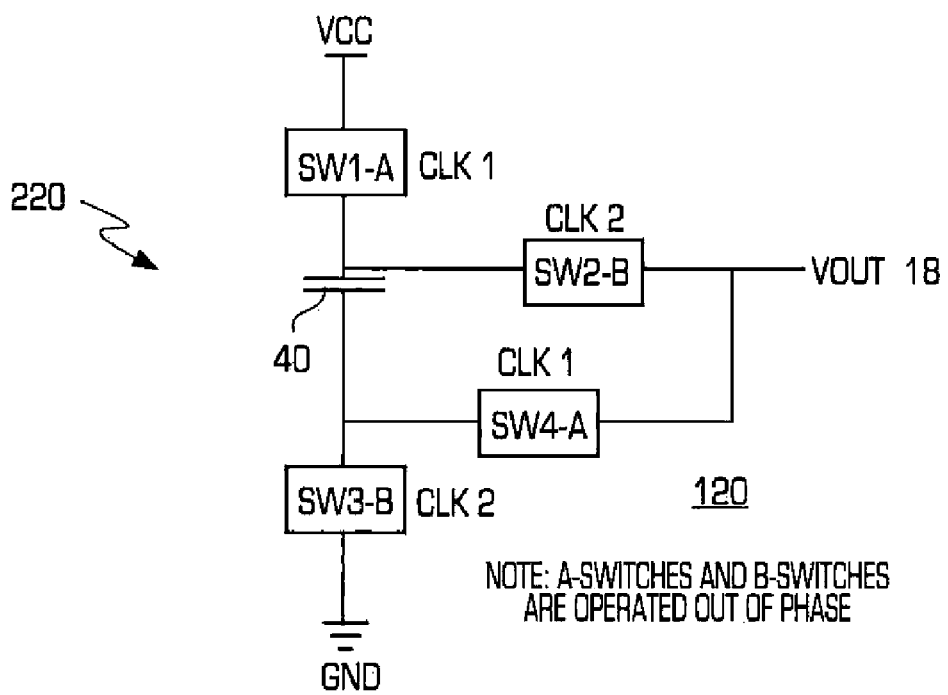
FIG. 4 is a circuit diagram of a third embodiment of the charge pump portion of the voltage conversion circuit shown in FIG. 1.

Referring to FIG. 4 there is shown a third embodiment of a charge pump 220 for use in the conversion circuit 10 of the present invention. In this embodiment 220, the charge pump 220 has only a single capacitor 40. The capacitor 40 has a first end and a second end. The first end of the capacitor 40 is connected through the switch SW1-A to the input voltage Vcc. In addition, the first end of the capacitor 40 is connected to the output voltage signal Vout 18 through a switch SW2-B. The second end of the capacitor 40 is connected to ground through the switch SW3-B. In addition, the second end of the capacitor 40 is connected to Vout 18 through a switch SW4-A. The switches SW1-A and SW4-A are activated by a first clock signal CLK 1. The switches SW2-B and SW3-B are activated by a second clock signal CLK 2. The first and second clock signals are out of phase by about one hundred eighty degrees. Each of the switches SW1-A, SW2-B, SW3-B, and SW4-A can be transistor.

In the operation of the charge pump 220, in the event the first clock signal CLK 1 is active, then the switches SW1-A and SW4-A are on, connecting the input voltage Vcc to the first end of the capacitor 40, and connecting the second end of the capacitor 40 to Vout 18. During this phase, the input power supply Vcc supplies a voltage of Vcc across the capacitor 40 which is in series with the load capacitor 32, and supplies a current of I. Once the capacitor 40 has been so charged, the first clock signal CLK 1 is turned off The second clock signal CLK 2 then turns on. In this phase, the second clock signal CLK 2 connects the second end of the capacitor 40 to ground through the switch SW3-B. This discharges the capacitor 40 which is in parallel to the load capacitor 32. Because the charge and discharge phase involves the same amount of capacitance, the voltage output at the Vout 18 node would be Vcc/2, and the current would be 2I. In this embodiment, the charge pump 220 uses a single switched capacitor 40, and the size of this capacitor 40 is normally a fraction of the size of the holding capacitor 32 tied between Vout 18 and Ground.

The theory of operation for this embodiment is as follows. Every clock cycle of the first clock signal has a frequency of f The capacitor 40 has a capacitance of C1. During each cycle that the first clock signal is on, the capacitor 40 is charged by a voltage amount of $V. Thus, the input current is $$Iin = f \times C1 \times \$V$$

The output current has contribution from this amount. However, the output current also has contribution of current during the time when the second clock signal is active. During the time when the second clock signal is active, the capacitor C1 will be discharged by the amount of $V into the load 30. Thus, the output current will be:

$$Iout = Iin + f \times C1 \times \$V.$$

The ratio of the two currents is $$Iout/Iin = 2$$

Figure 5:
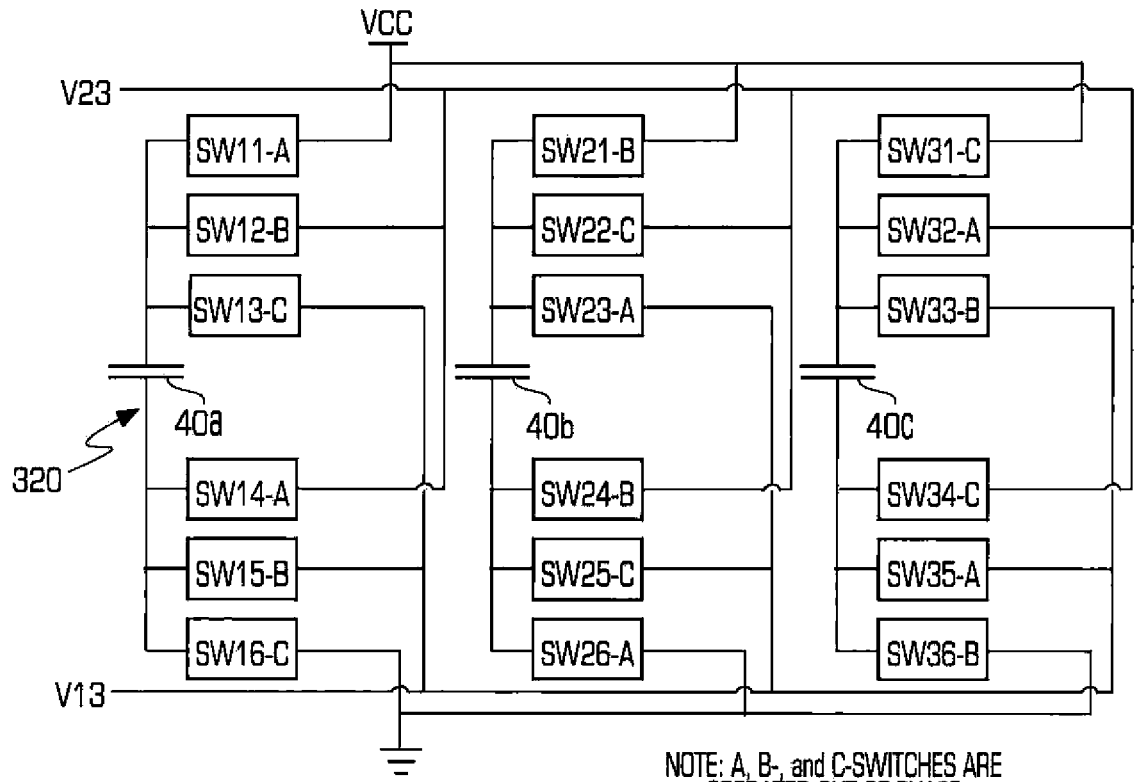
FIG. 5 is a circuit diagram of a fourth embodiment of the charge pump portion of the voltage conversion circuit shown in FIG. 1.

Referring to FIG. 5 there is shown a fourth embodiment of the charge pump 320 for use in the conversion circuit 10 of the present invention. The charge pump 320 comprises three nearly identical circuits, each with a single capacitor 40a, 40b, and 40c. The three circuits for the three capacitors 40a, 40b and 40c are switched by three clock signals, CLK 1, CLK 2, and CLK 3, which are out of phase from one another by approximately 120 degrees. Thus, CLK 2 is out of phase by about 120 degrees from CLK 1, and CLK 3 is out of phase by about 120 degrees from CLK 2 (and out of phase by about 240 degrees from CLK 1). In addition to Vcc the charge pump has two voltage nodes: V23 and V13, which is at 2/3 of Vcc and 1/3 of Vcc respectively. V23 also supplies Vout 18 for this embodiment of the charge pump 320. For the circuit with the capacitor 40a, the CLK 1 signal activates switches SW11-A and SW14-A to connect capacitor 40a to Vcc and V23 respectively. The CLK 2 signal activates switches SW12-B and SW15-B to connect capacitor 40a to V23 and V13 respectively. Finally, the CLK 3 signal activates switches SW13-C and SW16-C to connect capacitor 40a to V13 and ground, respectively. For the circuit with the capacitor 40b, the clock signal CLK 1 activates switches SW23-A and SW26-A and connects capacitor 40b to V13 and ground, respectively. The clock signal CLK 2 activates switches SW21-B and SW24-B and connects the capacitor 40b to Vcc and V23 respectively. The clock signal CLK 3 activates switches SW22-C and SW25-C and connects the capacitor 40b to V23 and V13 respectively. For the circuit with the capacitor 40c, the clock signal CLK 1 activates switches SW32-A and SW35-A and connects capacitor 40c to V23 and V13, respectively. The clock signal CLK 2 activates switches. SW33-B and SW36-B and connects the capacitor 40c to V13 and ground, respectively. The clock signal CLK 3 activates switches SW31-C and SW34-C and connects the capacitor 40c to Vcc and V23, respectively. Each of the switches SW11-A, SW12-B, SW13-C, SW14-A, SW15-B, SW16-C, SW21-B, SW22-C, SW23-A, SW24-B, SW25-C, SW26-A, SW31-C, SW32-A, SW33-B, SW34-C, SW35-A, and SW36-B can be a transistor.

In the operation, the following capacitors 40a, 40b and 40c are connected during the various phases:

| | CLK 1 - active | CLK 2 - active | CLK 3 - active |
|---|---|---|---|
| Capacitor 40a | Connects to Vcc and V23 | Connects to V23 and V13 | Connects to V13 and ground |
| Capacitor 40b | Connects to V13 and ground | Connects to Vcc and V23 | Connects to V23 and V13 |
| Capacitor 40c | Connects to V23 and V13 | Connects to V13 and ground | Connects to Vcc and V23 |

Therefore, at Vout 18 (V23), the voltage is approximately (2/3)*Vcc, and the current is approximately (3/2)*Vcc.

Figure 6:
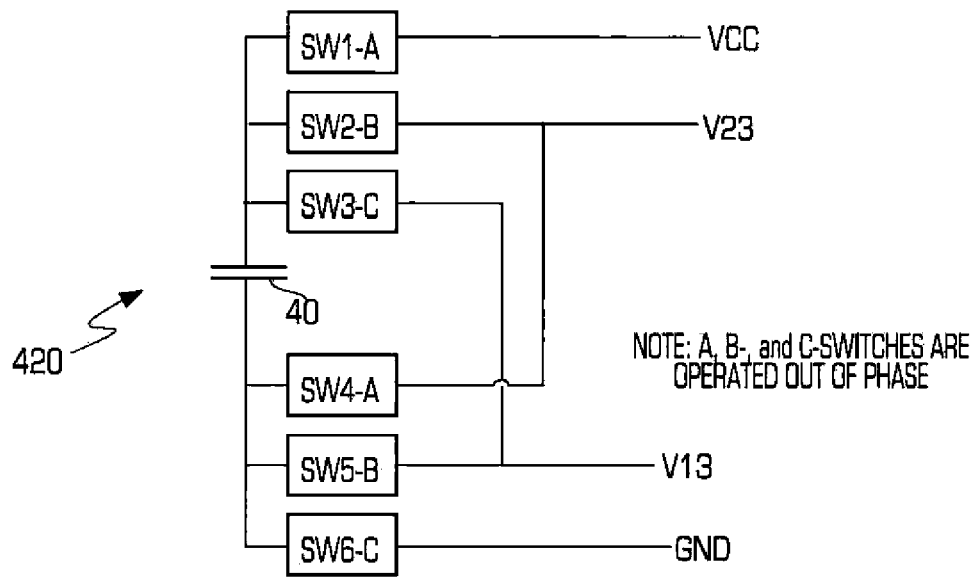
FIG. 6 is a circuit diagram of a fifth embodiment of the charge pump portion of the voltage conversion circuit shown in FIG. 1.

Referring to FIG. 6 there is shown an embodiment of the charge pump 420 similar but simplified compared to the embodiment 320 shown in FIG. 5. In this case two out of the three capacitors, and their associated switches, heave been removed. The remaining capacitor 40 is used in three consecutive time-slots. In contrast in the embodiment 320 shown in FIG. 5 each capacitor 40 (a-c) was used in every time-slot, by having three times as many capacitor/switch blocks. In the embodiment 420 a load can also be placed onto node V23 such that the load is at a voltage of approximately (2/3)*Vcc, and the current is about 150% of the current drawn from Vcc. A capacitor is needed to tie between node V13 and GND (or VCC) to hold the node voltage of V12 as the pump 420 goes through the three time-slots.

Figure 7A:
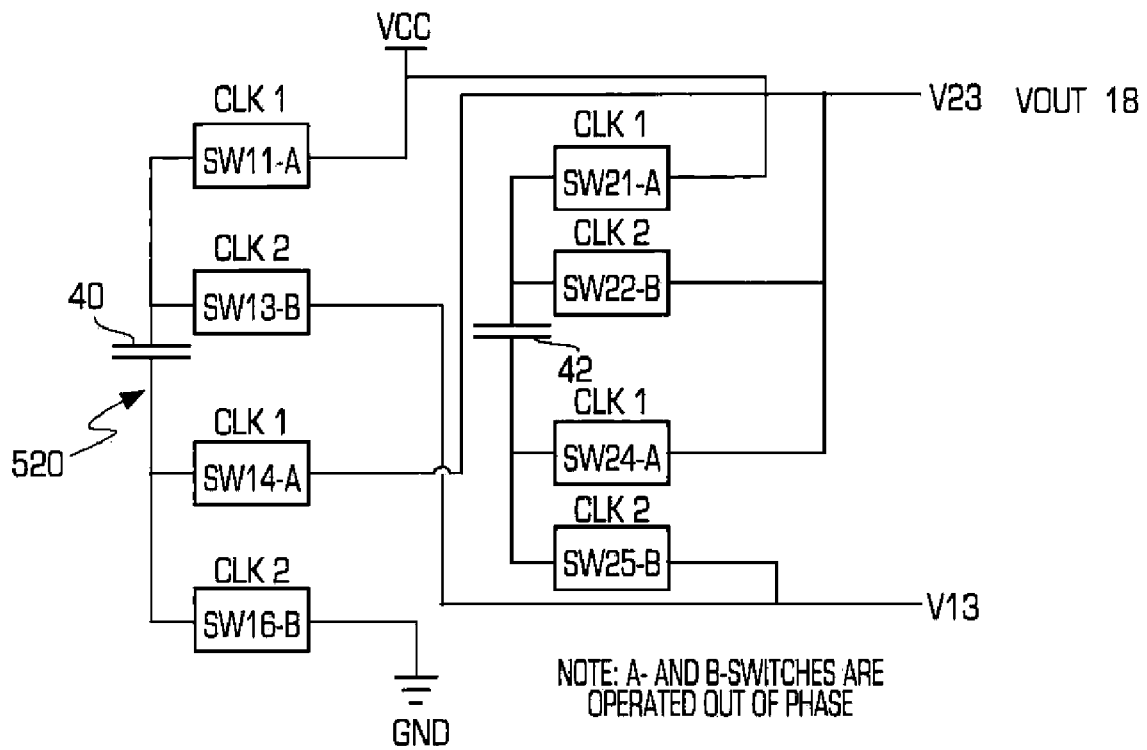
FIGS. 7a and 7b are circuit diagrams of two versions of a sixth embodiment of the charge pump portion of the voltage conversion circuit shown in FIG. 1.

Referring to FIG. 7a there is shown a schematic diagram of a first version of a sixth embodiment of the charge pump 520 for use in the conversion circuit 10 of the present invention. In this embodiment, the input voltage sources are Vcc, V23 and V13. A first capacitor 40 has a first end connected to Vcc through switch SW11-A. The first end of the capacitor is also connected to V13 through switch SW13-B. The second end of the capacitor 40 is connected to ground through switch SW16-B. Finally, the second end of capacitor 40 is connected to V23 through switch SW14-A. A second capacitor 42 has a first end connected to Vcc through switch SW21-A. The first end of capacitor 42 is connected to V23 through switch SW22-B. The second end of capacitor 42 is connected to V13 through switch SW25-B. Finally, the second end of capacitor 42 is connected to V23 through switch SW24-A. The switches SW11-A, SW14-A, SW21-A and SW24-A are activated by the first clock signal CLK1, while the switches SW13-B, SW16-B, SW22-B, and SW25-B are activated by the clock signal CLK 2. The clock signals CLK 1 and CLK 2 are one hundred eighty degrees out of phase. Each of the switches SW11-A, SW13-B, SW14-A, SW16-B, SW21-A, SW22-B, SW24-A and SW25-B can be a transistor.

In the operation of the embodiment of the charge pump 520, when the clock signal CLK 1 is active, switches SW11-A, SW14-A, SW21-A, and SW24-A are on connecting capacitors 40 and 42 in parallel to Vcc and Vout 18, respectively. Thus, capacitors 40 and 42 are charged during this phase with a voltage of Vcc and a current of I on each of the capacitors 40 and 42. When the clock signal CLK 2 is on, switches SW13-B, SW16-B, SW22-B and SW25-B are on connecting the capacitors 40 and 42 in series between ground and Vout 18. Therefore, during this phase the charge pump 520 outputs 2/3 Vcc at V23 or Vout 18 with a current of 3/2I.

Figure 7B:
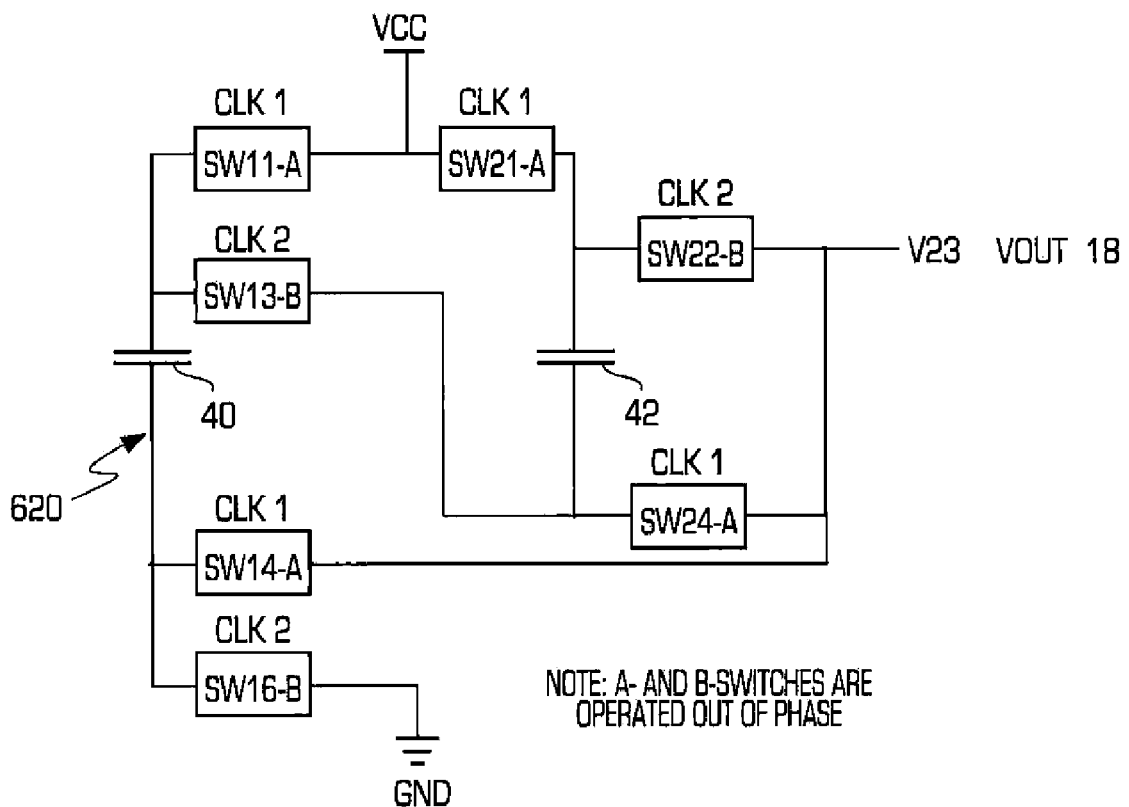

Referring to FIG. 7b there is shown a schematic diagram of a second version of a sixth embodiment of the charge pump 620 for use in the conversion circuit 10 of the present invention. In this embodiment, the output voltage Vout 18 is identical to the output voltage Vout 18 shown in FIG. 7a. The only difference between this embodiment 620 and the embodiment 520 shown in FIG. 7a is that one less switch is used in this embodiment. A first capacitor 40 has a first end connected to Vcc through switch SW11-A. the first end of capacitor 40 is also connected to the second end of capacitor 42 through switch SW13-B. The second end of the capacitor 40 is connected to ground through switch SW16-B. The second end of the capacitor 40 is also connected to the node V23 through switch SW14-A. The second capacitor 42 has a first end which is connected to Vcc through the switch SW21-A. The first end of the capacitor 42 is also connected to the node V23 through the switch SW22-B. Finally, the second end of the capacitor 42 is connected to the node V23 through the switch SW24-A.

In the operation of the embodiment of the charge pump 620, when the clock signal CLK 1 is active, switches SW11-A, SW14-A, SW21-A, and SW24-A are on connecting capacitors 40 and 42 in parallel to Vcc and V23, respectively. Thus, capacitors 40 and 42 are charged during this phase with a voltage of Vcc and a current of I on each of the capacitors 40 and 42. When the clock signal CLK 2 is on, switches SW13-B, SW16-B, and SW22-B are on connecting the capacitors 40 and 42 in series between ground and V23. During this phase the charge pump 620 outputs 2/3 Vcc at V23 with a current of 3/2I. Thus, the embodiment of the charge pump 620 operates in identical manner to the embodiment 520 shown in FIG. 7a.

The theory of operation for this embodiment of the charge pump 520 or 620 is as follows. Every clock cycle of the first clock signal has a frequency of f. Each of the capacitors 40 and 42 has a capacitance of C1. During each cycle that the first clock signal is on, the two capacitors 40 and 42 are charged by a voltage amount of $V. Thus, the total input current is $$Iin = f \times 2C1 \times \$V$$

The output current has contribution from this amount. However, the output current also has contribution of current during the time when the second clock signal is active. During the time when the second clock signal is active, the capacitor C1 will be discharged by the amount of $V into the load 30. Thus, the output current will be:

$$Iout = Iin + f \times 0.5 \, C1 \times 2\$V.$$

The ratio of the two currents is $$Iout/Iin = 1.5$$

Figure 8A:
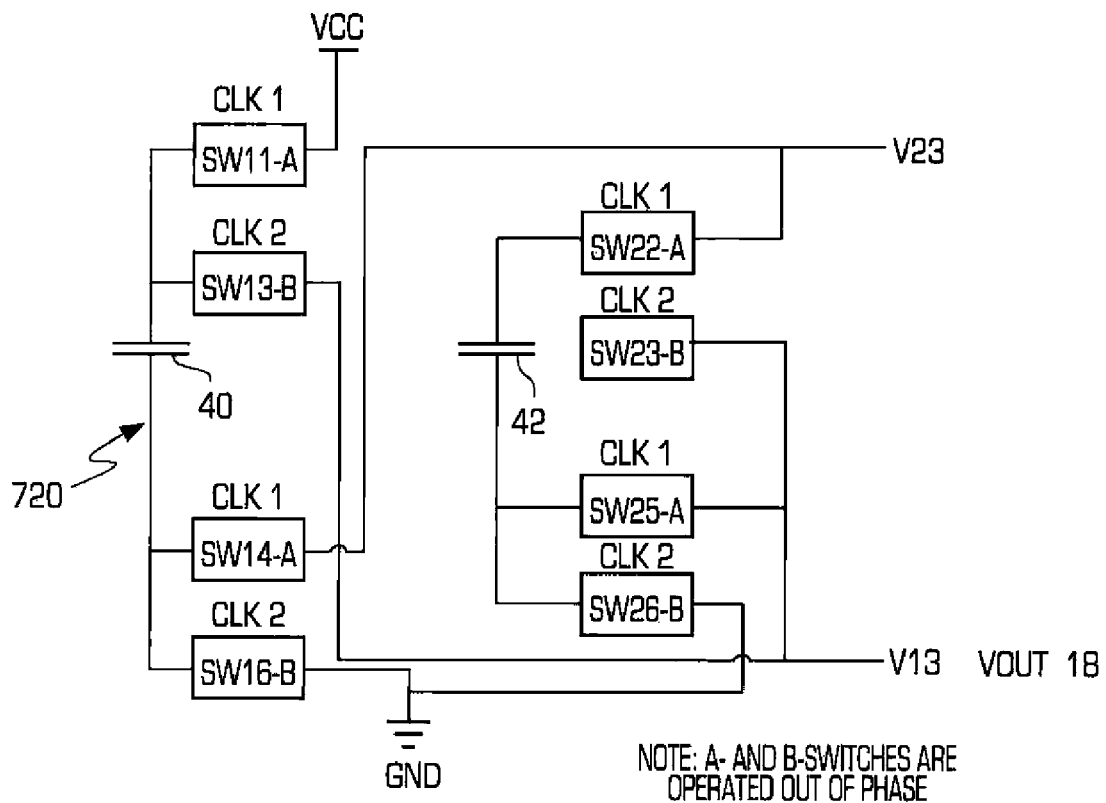
FIGS. 8a and 8b are circuit diagrams of two versions of a seventh embodiment of the charge pump portion of the voltage conversion circuit shown in FIG. 1.

Referring to FIG. 8a, there is shown a schematic diagram of a first version of a seventh embodiment of the charge pump 720 for use in the conversion circuit 10 of the present invention. In this embodiment, the input voltage sources are Vcc, V23 and V13, with V13 as the Vout 18. A first capacitor 40 has a first end connected to Vcc through switch SW11-A. the first end of capacitor 40 is also connected to V13 through switch SW13-B. The second end of the capacitor 40 is connected to ground through switch SW16-B. The second end of the capacitor 40 is also connected to the node V23 through switch SW14-A. The second capacitor 42 has a first end which is connected to V23 through the switch SW22-A. The first end of the capacitor 42 is also connected to the node V13 through the switch SW23-B. The second end of the capacitor 42 is connected to the node V13 through the switch SW25-A. Finally, the second end of the capacitor 42 is connected to ground through switch SW26-B. The switches SW11-A, SW14-A, SW22-A and SW25-A are activated by the first clock signal CLK1, while the switches SW13-B, SW16-B, SW23-B, and SW26-B are activated by the clock signal CLK 2. The clock signals CLK 1 and CLK 2 are one hundred eighty degrees out of phase. Each of the switches SW11-A, SW13-B, SW14-A, SW16-B, SW22-A, SW23-B, SW25-A and SW26-B can be a transistor.

In the operation of the embodiment of the charge pump 720, when the clock signal CLK 1 is active, switches SW11-A, SW14-A, SW22-A, and SW25-A are on connecting capacitors 40 and 42 in series between Vcc and V13 (or Vout 18), respectively. Thus, capacitors 40 and 42 are charged during this phase with a voltage of Vcc and a current of I on each of the capacitors 40 and 42. When the clock signal CLK 2 is on, switches SW13-B, SW16-B, SW23-B and SW26-B are on connecting the capacitors 40 and 42 in parallel between ground and V13. During this phase the charge pump 720 outputs 1/3 Vcc at V13 with a current of 3I.

Figure 8B:
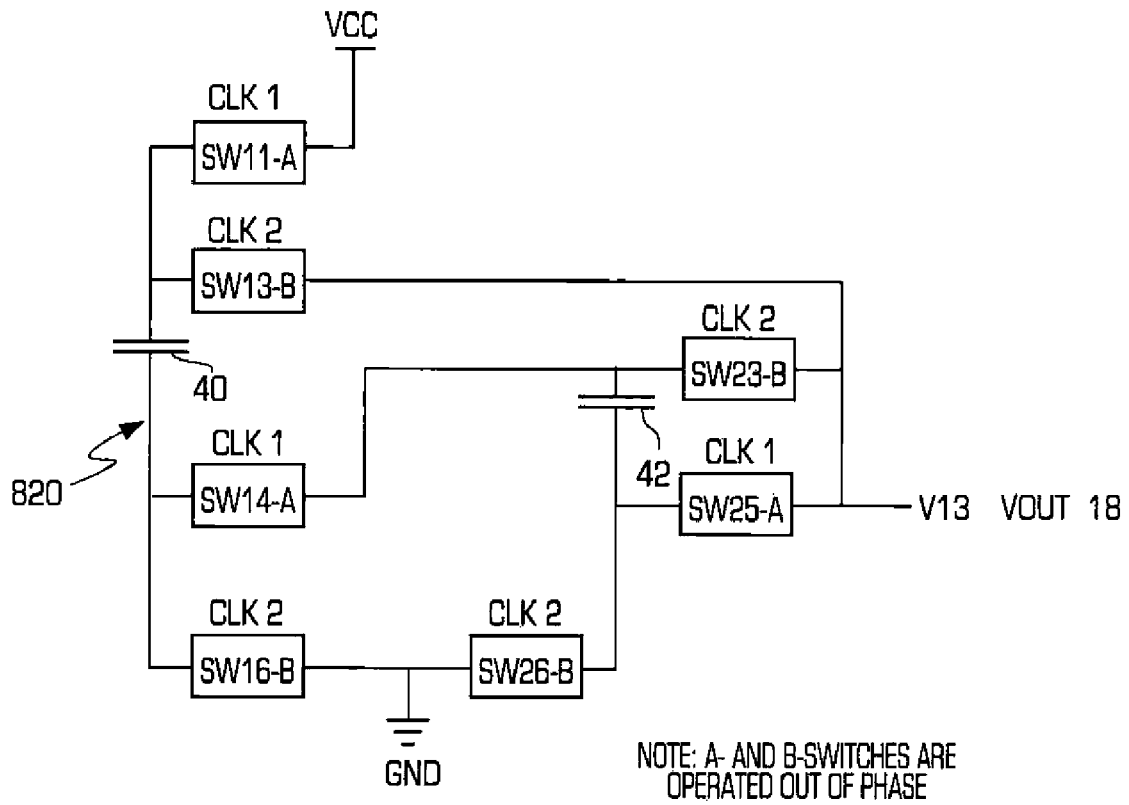

Referring to FIG. 8b there is shown a schematic diagram of a second version of a seventh embodiment of the charge pump 820 for use in the conversion circuit 10 of the present invention. In this embodiment, the output voltage Vout 18 is identical to the output voltage Vout 18 shown in FIG. 8a. The only difference between this embodiment 820 and the embodiment 720 shown in FIG. 8a is that one less switch is used in this embodiment. In this embodiment, the input voltage sources are Vcc, V23 and V13, with V13 as the Vout 18. A first capacitor 40 has a first end connected to Vcc through switch SW11-A. the first end of capacitor 40 is also connected to V13 through switch SW13-B. The second end of the capacitor 40 is connected to ground through switch SW16-B. The second end of the capacitor 40 is also connected to the first end for the capacitor 42 through switch SW14-A. The second capacitor 42 has a first end which is connected to V13 through the switch SW23-B. The second end of the capacitor 42 is connected to the node V13 through the switch SW25-A. Finally, the second end of the capacitor 42 is connected to ground through switch SW26-B. The switches SW11-A, SW14-A, and SW25-A are activated by the first clock signal CLK1, while the switches SW13-B, SW16-B, SW23-B, and SW26-B are activated by the clock signal CLK 2. The clock signals CLK 1 and CLK 2 are one hundred eighty degrees out of phase. Each of the switches SW11-A, SW13-B, SW14-A, SW16-B, SW23-B, SW25-A and SW26-B can be a transistor.

In the operation of the embodiment of the charge pump 820, when the clock signal CLK 1 is active, switches SW11-A, SW14-A, and SW25-A are on connecting capacitors 40 and 42 in series between to Vcc and V13 (or Vout 18), respectively. Thus, capacitors 40 and 42 are charged during this phase with a voltage of Vcc and a current of I on each of the capacitors 40 and 42. When the clock signal CLK 2 is on, switches SW13-B, SW16-B, SW23-B and SW26-B are on connecting the capacitors 40 and 42 in parallel between ground and V13. During this phase the charge pump 720 outputs 1/3 Vcc at V13 with a current of 3I.

The theory of operation for this embodiment of the charge pump 720 or 820 is as follows. Every clock cycle of the second clock signal has a frequency of f Each of the capacitors 40 and 42 has a capacitance of C1. During each cycle that the second clock signal is on, the two capacitors 40 and 42 are charged by a voltage amount of $V. Thus, the total input current is $$Iin = f \times 0.5 C1 \times 2\$V$$

The output current has contribution from this amount. However, the output current also has contribution of current during the time when the first clock signal is active. During the time when the first clock signal is active, the capacitors C1 which are connected in parallel will be discharged by the amount of $V into the load 30. Thus, the output current will be:

$$Iout=Iin+f\times 2C1\times \$V.$$  (5)

The ratio of the two currents is $$Iout/Iin=3$$

From the foregoing, it can be seen that by varying the capacitance of the capacitors in the charge pump 20, 120, 220, 320, 420, 520, 620, 720 or 820 the ratio of the input voltage to the output voltage and the converse multiplication of current can be varied to any desired ratio. Further, it can be seen that with the use of a charge pump and time domain feedback circuit, more accurate control and more efficient DC direct to DC conversion is possible.

What is claimed is:

1. A voltage conversion circuit comprising:
   an oscillating circuit for generating a clock signal;
   a capacitor based charge pump circuit for receiving the clock signal and an input voltage signal having an input current and for generating an output voltage signal, less than the input voltage signal and an output current greater than the input current;
   a comparator circuit for receiving a version of the output voltage signal, as a first input signal thereto, and a reference voltage signal as a second input signal thereto and for comparing the first input signal to the second input signal and for generating a control signal in response thereto;
   wherein the control signal is supplied to the oscillating circuit for controlling the generating of the clock signal; and
   wherein said charge pump circuit comprises:
   a capacitor, having a first end and a second end, wherein said second end provides the output voltage signal;
   a switch connected to the first end for connecting the first end to the input voltage signal, activated by a first clock signal, and for connecting the first end to ground activated by a second clock signal.

2. The voltage conversion circuit of claim 1 wherein said switch comprises a first switch activated by a first clock signal for connecting the first end to the input voltage, and a second switch activated by a second clock signal for connecting the first end to ground; and
   wherein said first and said second clock signals are out of phase by about one hundred eighty degrees.

3. A voltage conversion circuit comprising:
   an oscillating circuit for generating a clock signal;
   a capacitor based charge pump circuit for receiving the clock signal and an input voltage signal having an input current and for generating an output voltage signal, less than the input voltage signal and an output current greater than the input current;
   a comparator circuit for receiving a version of the output voltage signal, as a first input signal thereto, and a reference voltage signal as a second input signal thereto and for comparing the first input signal to the second input signal and for generating a control signal in response thereto;
   wherein the control signal is supplied to the oscillating circuit for controlling the generating of the clock signal; and
   wherein said charge pump circuit comprises:
   a capacitor, having a first end and a second end;
   a first switch connected to the first end for connecting the first end to the input voltage signal, activated by a first clock signal;
   a second switch connected to the first end for outputting the output voltage signal, said second switch activated by a second clock signal;
   a third switch connected to the second end for outputting the output voltage signal, said third switch activated by the first clock signal; and
   a fourth switch connected to the second end for connecting the second end to ground, activated by the second clock signal;
   wherein said first clock signal and said second clock signal are out of phase by about one hundred eighty degrees.

4. A voltage conversion circuit comprising:
   an oscillating circuit for generating a clock signal;
   a capacitor based charge pump circuit for receiving the clock signal and an input voltage signal having an input current and for generating an output voltage signal, less than the input voltage signal and an output current greater than the input current;
   a comparator circuit for receiving a version of the output voltage signal, as a first input signal thereto, and a reference voltage signal as a second input signal thereto and for comparing the first input signal to the second input signal and for generating a control signal in response thereto;
   wherein the control signal is supplied to the oscillating circuit for controlling the generating of the clock signal; and
   wherein said charge pump circuit comprises:
   a first capacitor, having a first end and a second end;
   a second capacitor having a first end and a second end; wherein the second end of the first capacitor and the second end of the second capacitor are connected together and provide the output voltage signal;
   a first switch, responsive to the clock signal, and connected to the first capacitor for alternatingly connecting the first capacitor to the input voltage signal and to ground;
   a second switch, responsive to the clock signal, and connected to the second capacitor for alternatingly connecting the second capacitor to the input voltage signal and to ground;
   wherein said first switch in a first phase of the clock signal connects the first capacitor to the input voltage, while the second switch connects the second capacitor to ground; and
   in a second phase of the clock signal connects the first capacitor to ground, while the second switch connects the second capacitor to the input signal.

5. The voltage conversion circuit of claim 4 wherein:
   said first switch comprises a third switch responsive to a first clock signal for connecting the first end of the first capacitor to the input voltage; and
   a fourth switch responsive to a second clock signal for connecting the second end of the first capacitor to ground;
   said second switch comprises a fifth switch responsive to the second clock signal for connecting the first end of the second capacitor to the input voltage; and a sixth switch responsive to the first clock signal for connecting the second end of the second capacitor to ground;
   wherein said first clock signal and said second clock signal are out of phase by about one hundred eighty degrees.

6. A voltage conversion circuit comprising:
an oscillating circuit for generating a clock signal;
a capacitor based charge pump circuit for receiving the clock signal and an input voltage signal having an input current and for generating an output voltage signal, less than the input voltage signal and an output current greater than the input current;
a comparator circuit for receiving a version of the output voltage signal, as a first input signal thereto, and a reference voltage signal as a second input signal thereto and for comparing the first input signal to the second input signal and for generating a control signal in response thereto;
wherein the control signal is supplied to the oscillating circuit for controlling the generating of the clock signal; and
wherein said charge pump circuit comprises:
a first capacitor, having a first end and a second end;
a second capacitor having a first end and a second end, with said second end of the second capacitor connected to ground;
wherein the second end of the first capacitor is connected to the first end of the second capacitor and provides the output voltage signal;
a switch connected to the first end of the first capacitor for connecting the first end to the input voltage signal, activated by a first clock signal, and for connecting the second end to ground activated by a second clock signal;
wherein said first clock signal and said second clock signal are out of phase by about one hundred eighty degrees.

7. A voltage conversion circuit comprising:
an oscillating circuit for generating a clock signal;
a capacitor based charge pump circuit for receiving the clock signal and an input voltage signal having an input current and for generating an output voltage signal, less than the input voltage signal and an output current greater than the input current;
a comparator circuit for receiving a version of the output voltage signal, as a first input signal thereto, and a reference voltage signal as a second input signal thereto and for comparing the first input signal to the second input signal and for generating a control signal in response thereto;
wherein the control signal is supplied to the oscillating circuit for controlling the generating of the clock signal; and
wherein said charge pump circuit comprises:
a first capacitor having a first end and a second end;
a second capacitor having a first end and a second end, wherein the second end of the second capacitor is connected to the first end of the first capacitor, and the first end of the second capacitor provides the output voltage signal;
a first switch, activated by a first clock signal connects the second end of the first capacitor to the input voltage signal;
a second switch, activated by the first clock signal connects the first end of the first capacitor to the first end of the second capacitor;
a third switch, activated by a second clock signal, connects the first end of the first capacitor to ground;
wherein the first clock signal and the second clock signal are out of phase by about one hundred eighty degrees.

8. A voltage conversion circuit comprising:
an oscillating circuit for generating a clock signal;
a capacitor based charge pump circuit for receiving the clock signal and an input voltage signal having an input current and for generating an output voltage signal, less than the input voltage signal and an output current greater than the input current;
a comparator circuit for receiving a version of the output voltage signal, as a first input signal thereto, and a reference voltage signal as a second input signal thereto and for comparing the first input signal to the second input signal and for generating a control signal in response thereto;
wherein the control signal is supplied to the oscillating circuit for controlling the generating of the clock signal; and
wherein said charge pump circuit comprises:
a first capacitor having a first end and a second end;
a second capacitor having a first end and a second end, wherein the second end of the second capacitor is connected to the second end of the first capacitor, and the first end of the second capacitor provides the output voltage signal;
a first switch, activated by a first clock signal connects the second end of the first capacitor to ground;
a second switch, activated by the first clock signal connects the first end of the first capacitor to the first end of the second capacitor;
a third switch, activated by a second clock signal, connects the first end of the first capacitor to the input voltage signal;
wherein the first clock signal and the second clock signal are out of phase by about one hundred eighty degrees.

\* \* \* \* \*